United States Patent
Kambara et al.

(10) Patent No.: US 11,664,530 B2
(45) Date of Patent: May 30, 2023

(54) PRODUCTION METHOD FOR SOLID ELECTROLYTE

(71) Applicant: IDEMITSU KOSAN CO.,LTD., Chiyoda-ku (JP)

(72) Inventors: Takayoshi Kambara, Chiba (JP); Minoru Senga, Sodegaura (JP); Hiroyuki Tamura, Sodegaura (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/260,379

(22) PCT Filed: Jul. 16, 2019

(86) PCT No.: PCT/JP2019/027932
§ 371 (c)(1),
(2) Date: Jan. 14, 2021

(87) PCT Pub. No.: WO2020/017500
PCT Pub. Date: Jan. 23, 2020

(65) Prior Publication Data
US 2021/0367266 A1    Nov. 25, 2021

(30) Foreign Application Priority Data

Jul. 17, 2018 (JP) .............................. JP2018-134421

(51) Int. Cl.
*H01M 10/0562* (2010.01)
*C01B 25/14* (2006.01)
*H01M 10/0525* (2010.01)

(52) U.S. Cl.
CPC ......... *H01M 10/0562* (2013.01); *C01B 25/14* (2013.01); *H01M 10/0525* (2013.01);
(Continued)

(58) Field of Classification Search
CPC ........ H01M 10/0525; H01M 6/18; C03C 4/18
See application file for complete search history.

(56) References Cited

U.S. PATENT DOCUMENTS

2013/0288134 A1* 10/2013 Hama ..................... H01M 6/18
429/322
2014/0011069 A1*  1/2014 Zhou .................... H01M 10/058
429/160
(Continued)

FOREIGN PATENT DOCUMENTS

CN      103052995 A    4/2013
CN      105324878 A    2/2016
(Continued)

OTHER PUBLICATIONS

International Search Report dated Oct. 15, 2019 in PCT/JP2019/027932 filed on Jul. 16, 2019, citing references AA, AB, and AO-AR therein, 2 pages.

(Continued)

*Primary Examiner* — Khanh T Nguyen
(74) *Attorney, Agent, or Firm* — Oblon, McClelland, Maier & Neustadt, L.L.P.

(57) ABSTRACT

Provided is a method for producing a solid electrolyte having peaks at $2\theta=20.2°\pm0.5°$ and $23.6°\pm0.5°$ in X-ray diffractometry using a CuKα ray and containing a lithium element, a phosphorus element, a sulfur element, and a halogen element, the method including using raw materials containing yellow phosphorus and a compound containing a lithium element, a sulfur element, and a halogen element.

20 Claims, 2 Drawing Sheets

(52) U.S. Cl.
CPC ...... *C01P 2002/72* (2013.01); *C01P 2006/40* (2013.01); *H01M 2300/008* (2013.01)

(56) References Cited

U.S. PATENT DOCUMENTS

| | | | |
|---|---|---|---|
| 2015/0357675 | A1 | 12/2015 | Ohtomo et al. |
| 2017/0155170 | A1* | 6/2017 | Sato .......................... C03C 4/18 |
| 2017/0162901 | A1* | 6/2017 | Chen ................. H01M 10/0525 |
| 2019/0074542 | A1 | 3/2019 | Makino et al. |

FOREIGN PATENT DOCUMENTS

| | | |
|---|---|---|
| JP | 2005-228570 A | 8/2005 |
| JP | 2013-16423 A | 1/2013 |
| JP | 2014-35865 A | 2/2014 |
| JP | 2016-207354 A | 12/2016 |
| JP | 2017-183210 A | 10/2017 |
| TW | 200305889 A | 11/2003 |
| WO | WO 2017/159667 A1 | 9/2017 |

OTHER PUBLICATIONS

Kanayama et al., "On the Starting Materials of Phosphorous Compounds", Organic Chemical Synthesis, 1953, vol. 11, No. 3, pp. 1-8.
Office Action dated Jul. 4, 2022, in Chinese Patent Application No. 201980047365.0 filed Jul. 16, 2019, citing documents 15-17.

* cited by examiner

PRODUCTION METHOD FOR SOLID ELECTROLYTE

TECHNICAL FIELD

The present invention relates to a method for producing a solid electrolyte.

BACKGROUND ART

In the field of all-solid batteries, heretofore, a solid electrolyte has been known. For example, it has been reported in PTL 1 that lithium sulfide and phosphorus sulfide are reacted to produce a sulfide glass and the sulfide glass is subjected to a heat treatment to give a glass ceramic electrolyte having a high ion conductivity (for example, see PTL 1). In addition, it has been reported that a glass ceramic electrolyte having a high ion conductivity can be obtained by reacting lithium halide, lithium sulfide, and phosphorus sulfide to produce a sulfide glass and subjecting the sulfide glass to a heat treatment (for example, see PTL 2). This glass ceramic electrolyte is a solid electrolyte having a diffraction peak of a crystal structure similar to that of a $Li_4-xGe1-xP_xS_4$-based thio-LISICON Region II type (hereinafter sometimes referred to as "RII solid electrolyte"). Further, PTL 3 describes a sulfide solid electrolytic glass containing LiI and an ion conductor composed of $Li_4P_2S_6$, and describes that elemental phosphorus (red phosphorus) is used in the examples thereof. In addition, NPL 1 describes that, in synthesizing phosphorus pentasulfide industrially, yellow phosphorus is subjected to a reaction at a high temperature (about 490° C.) and the resultant is purified by distillation at 515 to 520° C., that phosphorus pentasulfide is easily deteriorated by the influence of moisture or the like during storage and transportation, and that commercially available phosphorus pentasulfide includes low-order sulfides (for example, tetraphosphorus heptasulfide ($P_4S_7$) and tetraphosphorus nonasulfide ($P_4S_9$), and the like).

CITATION LIST

Patent Literature

PTL 1: JP 2005-228570 A
PTL 2: JP 2016-207354 A
PTL 3: JP 2014-035865 A

Non-Patent Literature

NPL 1: "Organic Chemical Synthesis", Vol. 11, No. 3, pp. 6-7, published in 1953

SUMMARY OF INVENTION

Technical Problem

As described in PTLs 1 and 2, phosphorus sulfide has been widely used in the production of solid electrolytes. Among them, phosphorus pentasulfide ($P_2S_5$) has been widely used because it is commercially available and easily available. However, as described in NPL 1, it is known that commercially available phosphorus pentasulfide contains low-order sulfides (for example, tetraphosphorus heptasulfide ($P_1S_7$), tetraphosphorus nonasulfide ($P_1S_9$), and the like), and there is a concern that the performance of solid electrolytes may deteriorate due to the low-order sulfides.

In addition, as in PTL 3, use of elemental phosphorus (red phosphorus) as a substance that supplies phosphorus other than phosphorus sulfide has also been studied, but the obtained solid electrolyte is limited to sulfide glass having a low ion conductivity.

The present invention has been made in view of such circumstances, and an object of the present invention is to provide a method for producing an RII solid electrolyte using a phosphorus element supply material other than phosphorus sulfide.

Solution to Problem

As a result of intensive studies to solve the above-mentioned problems, the present inventors have found that the problems can be solved by using yellow phosphorus as a phosphorus element supply material and performing a reaction.

Advantageous Effects of Invention

According to the present invention, it is possible to provide a method for producing a solid electrolyte having stable and high ion conductivity.

DESCRIPTION OF EMBODIMENTS

Figure 1:
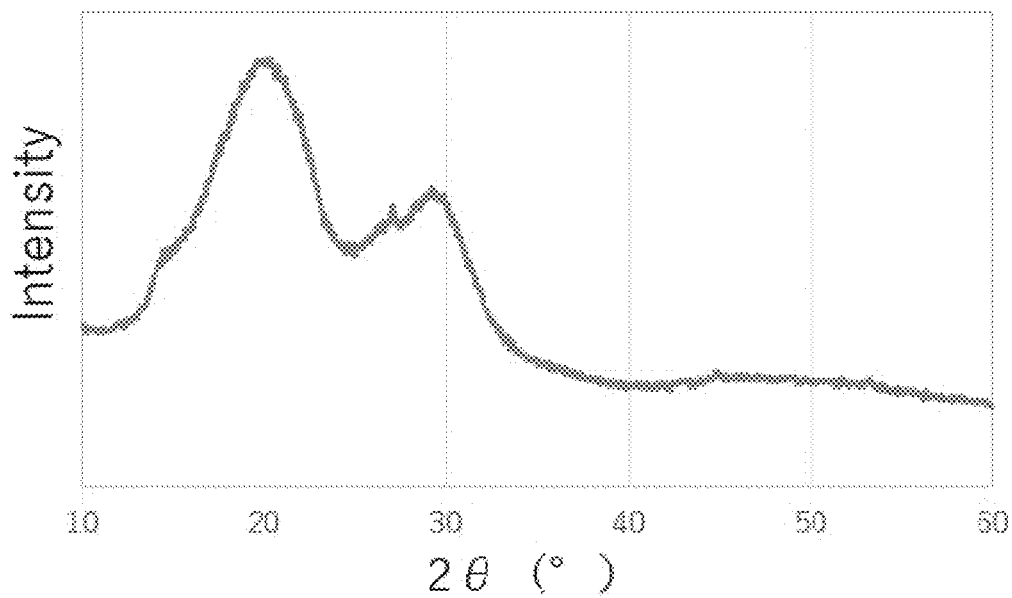
FIG. 1 is an X-ray analysis spectrum of the amorphous solid electrolyte obtained in Example 1.

Hereinafter, an embodiment of the present invention (hereinafter, sometimes referred to as "the present embodiment") will be described. In the description herein, numerical values related to "or more", "or less", and "to" in the description of numerical ranges are numerical values that can be arbitrarily combined.

A method for producing a solid electrolyte according to the present embodiment produces a solid electrolyte having peaks at $2\theta=20.2°±0.5°$ and $23.6°±0.5°$ in X-ray diffractometry using a CuKα ray and containing a lithium element, a phosphorus element, a sulfur element, and a halogen element, and the method includes using raw materials containing yellow phosphorus and a compound containing a lithium element, a sulfur element, and a halogen element.

(Yellow Phosphorus)

In the production method of the present embodiment, it is necessary to use yellow phosphorus as a phosphorus element supply material. If yellow phosphorus is not used, a solid electrolyte having stable and high ion conductivity cannot be obtained.

Yellow phosphorus is an allotrope of phosphorus composed of molecules represented by molecular formula $P_4$, and is also referred to as white phosphorus. As the yellow phosphorus, any commercially available yellow phosphorus can be used without particular limitation as long as the yellow phosphorus is produced using, as a raw material, a phosphate ore containing calcium phosphate as a main component, red phosphorus, or the like. Examples of the yellow phosphorus include crude yellow phosphorus containing metal elements such as antimony, iron, zinc, and arsenic contained as metal impurities in a raw material such as phosphate ore in a total amount of about 250 ppm by mass or less, and high-purity yellow phosphorus obtained by removing metal impurities therefrom to about 100 ppm by mass or less, and in the present embodiment, any of them may be used. From the viewpoint of obtaining a solid electrolyte having more stable and high ion conductivity, the amount of metal impurities contained in yellow phosphorus is preferably as small as possible, and purified yellow phosphorus is preferably used.

In the present embodiment, red phosphorus (excluding red phosphorus contained in the above-mentioned yellow phosphorus), black phosphorus, purple phosphorus, a diatomic molecule of phosphorus (diphosphorus), or the like, which is an allotrope of phosphorus, can be used in combination with yellow phosphorus as the phosphorus element supply material. However, from the viewpoint of obtaining a solid electrolyte having more stable and high ion conductivity, it is preferable not to use the above-mentioned other allotrope of phosphorus. When yellow phosphorus and the other allotrope of phosphorus are used in combination, the amount of the other allotrope of phosphorus to be used with respect to 100 parts by mass of yellow phosphorus is preferably 30 parts by mass or less, more preferably 15 parts by mass or less, still more preferably 5 parts by mass or less, even more preferably 3 parts by mass or less, and particularly preferably 0 parts by mass of yellow phosphorus, that is, it is particularly preferable not to use the other allotrope of phosphorus. As described above, the yellow phosphorus is obtained by converting a part of white phosphorus into red phosphorus, and the yellow phosphorus substantially contains red phosphorus. The red phosphorus exemplified as the other allotrope of phosphorus is red phosphorus used in combination with the yellow phosphorus separately from the red phosphorus contained in the yellow phosphorus.

In addition, in the present embodiment, phosphorus sulfide such as phosphorus trisulfide ($P_2S_3$), phosphorus pentasulfide ($P_2S_5$), and the like may be used, but the amount used is preferably as low as possible, and specifically, it is preferably 50 parts by mass or less, more preferably 30 parts by mass or less, and still more preferably 15 parts by mass or less with respect to 100 parts by mass of yellow phosphorus.

Since yellow phosphorus is an unstable substance having a low ignition point and is usually stored in water in many cases, it has not been conventionally considered as an advantageous raw material in a method for producing a solid electrolyte in which the presence of moisture is desired to be reduced as much as possible (for example, JP 2014-209430 A). Further, in order to obtain the RII solid electrolyte having a high ion conductivity among solid electrolytes, it is necessary to finely control the reaction temperature. However, since yellow phosphorus has a low ignition point and tends to generate heat, it has been considered that yellow phosphorus is not an advantageous raw material for the reaction in the method for producing a solid electrolyte. That is, as described in NPL 1, phosphorus pentasulfide used as a raw material of the RII solid electrolyte is synthesized from yellow phosphorus as a raw material at a temperature as high as 500° C. Therefore, it could be easily predicted that yellow phosphorus is unlikely to be used as a raw material of the RII solid electrolyte obtained by a reaction at a relatively low temperature of about 200° C. Further, it has been considered that, in general, elemental phosphorus such as yellow phosphorus has a P—P bond, and therefore, when this is used as a raw material for solid electrolytes, the obtained solid electrolytes tend to have a $P_2S_6^{4-}$ structure having a P—P bond, and this tendency becomes more remarkable when, for example, a treatment such as mixing, stirring, and pulverization described later is performed, which makes it difficult to obtain the RII solid electrolyte, and also results in poor dispersion of halogen elements, thereby making it impossible to obtain a solid electrolyte having a high ion conductivity. That is, the RII solid electrolyte has a crystal structure, but as described in PTL 3, when the crystal structure is formed via a glass having a $P_2S_6^{4-}$ structure, there is a concern that the ion conductivity may decrease.

Under such circumstances, the inventors have found that the RII solid electrolyte having a high ion conductivity can be easily obtained by intentionally using yellow phosphorus as a phosphorus element supply material. Among yellow phosphorus, red phosphorus, and other elemental phosphorus, which are generally considered to be unsuitable as raw materials for solid electrolytes, only yellow phosphorus was found to exhibit such unique properties. Although the reason is not clear, it is considered that yellow phosphorus has a higher rate of formation of the RII type crystal structure and a relatively smaller amount of formation of the $P_2S_6^{4-}$ structure than other elemental phosphorus, and as a result, a solid electrolyte having a high ion conductivity is obtained.

(Compound Containing Lithium Element, Sulfur Element, and Halogen Element)

In the production method of the present embodiment, a compound containing a lithium element, a sulfur element, and a halogen element (hereinafter, may be simply referred to as a "compound") is used as a substance to be reacted with yellow phosphorus. By using the compound containing these elements, the RII solid electrolyte having a high ion conductivity is obtained. That is, in the production method of the present embodiment, yellow phosphorus is reacted with the above-mentioned compound to produce a solid electrolyte containing a lithium element, a phosphorus element, a sulfur element, and a halogen element.

The compound containing a lithium element, a sulfur element, and a halogen element is not limited to a single compound, and may be a plurality of compounds. Examples thereof include a compound containing a lithium element, a compound containing a sulfur element, a compound containing a halogen element, and a compound containing at least two of a lithium element, a sulfur element, and a halogen element.

Preferred examples of the compound containing a lithium element include lithium compounds such as lithium sulfide ($Li_2S$), lithium oxide ($Li_2O$), and lithium carbonate ($Li_2CO_3$), and elemental lithium metals. As the lithium compound, lithium sulfide ($Li_2S$) is particularly preferable from the viewpoint of obtaining higher ion conductivity and excellent battery performance. Lithium sulfide ($Li_2S$) is a raw material containing a lithium element and a sulfur element, but in the present embodiment, it may be a compound containing a lithium element and a sulfur element, which is at least two elements of a lithium element, a sulfur element, and a halogen element, or it may be a raw material composed only of a lithium element such as elemental metal lithium, or it may be a raw material such as the above-mentioned lithium oxide ($Li_2O$) or lithium carbonate ($Li_2CO_3$) containing a lithium element and an element other than a sulfur element and a phosphorus element.

Preferred examples of the compound containing a sulfur element include compounds containing a sulfur element among the compounds containing a lithium element. In addition, preferred examples of the compound containing a sulfur element include elemental sulfur such as α-sulfur, β-sulfur, and γ-sulfur; alkali metal sulfides such as sodium sulfide ($Na_2S$), potassium sulfide ($K_2S$), rubidium sulfide ($Rb_2S$), and cesium sulfide ($Cs_2S$); and metal sulfides such as silicon sulfide ($SiS_2$), germanium sulfide ($GeS_2$), boron sulfide ($B_2S_3$), gallium sulfide ($Ga_2S_3$), tin sulfide (SnS or $SnS_2$), aluminum sulfide ($Al_2S_3$), and zinc sulfide (ZnS).

As the compound containing a sulfur element, elemental sulfur and an alkali metal sulfide are preferable from the viewpoint of obtaining a solid electrolyte having more stable and high ion conductivity. In addition, as the alkali metal sulfide, there is also lithium sulfide ($Li_2S$) exemplified as the raw material containing lithium, and it is needless to say that lithium sulfide ($Li_2S$) is preferable in consideration of the fact that it is preferable to use alkali metals having smaller molecular weights from the viewpoint of improving ion conductivity.

Preferred examples of the compound containing a halogen element include lithium halides such as lithium fluoride (LiF), lithium chloride (LiCl), lithium bromide (LiBr), and lithium iodide (LiI); elemental halogens such as fluorine, chlorine, bromine, and iodine; phosphorus halides such as various phosphorus fluorides ($PF_3$ and $PF_5$), various phosphorus chlorides ($PCl_3$, $PCl_5$, and $P_2Cl_4$), phosphorus oxychloride ($POCl_3$), various phosphorus bromides ($PBr_3$ and $PBr_5$), phosphorus oxybromide ($POBr_3$), and various phosphorus iodides ($PI_3$ and $P_2I_4$); phosphorus thiohalides such as thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichloride fluoride ($PSCl_2S$), and thiophosphoryl dibromide fluoride ($PSBr_2F$); and metal halides such as sodium halides such as sodium iodide (NaI), sodium fluoride (NaF), sodium chloride (NaCl), and sodium bromide (NaBr), aluminum halides, silicon halides, germanium halides, arsenic halides, selenium halides, tin halides, antimony halides, tellurium halides, and bismuth halides.

As the compound containing a halogen element, from the viewpoint of obtaining a solid electrolyte having more stable and high ion conductivity, phosphorus halide, phosphorus thiohalide, lithium halide, and elemental halogen are preferable, and lithium halide and elemental halogen are more preferable, and lithium bromide and lithium iodide are preferable as the lithium halide, and bromine and iodine are preferable as the elemental halogen.

In the present embodiment, when the above-mentioned phosphorus element supply material and the above-mentioned compound are used, the molar ratio of the phosphorus element, the lithium element, the sulfur element, and the halogen element (phosphorus element lithium element sulfur element halogen element) is preferably 0.8 or more and 1.2 or less 2.5 or more and 4.5 or less 3.0 or more and 5.0 or less 0.1 or more and 1.0 or less, more preferably 0.9 or more and 1.1 or less: 3.0 or more and 4.0 or less: 3.5 or more and 4.5 or less 0.2 or more and 0.8 or less, and still more preferably 0.95 or more and 1.05 or less 3.2 or more and 3.8 or less 3.8 or more and 4.2 or less 0.25 or more and 0.7 or less. Within the above range, the obtained solid electrolyte is likely to exhibit an RII type crystal structure, and a solid electrolyte having more stable and high ion conductivity is obtained.

In the present embodiment, the molar ratio of the lithium element to the phosphorus element (lithium element/phosphorus element) is preferably more than 3.0, more preferably 3.1 or more, and still more preferably 3.2 or more, and the upper limit is preferably 4.0 or less, and more preferably 3.8 or less.

In addition, in the present embodiment, the molar ratio of the sulfur element to the phosphorus element (sulfur element/phosphorus element) is preferably 3.5 or more, more preferably 3.7 or more, and still more preferably 3.8 or more, and the upper limit is preferably 4.5 or less, more preferably 4.3 or less, and still more preferably 4.2 or less.

Further, the molar ratio of the halogen element to the phosphorus element (halogen element/phosphorus element) is preferably 0.10 or more, more preferably 0.20 or more, and still more preferably 0.30 or more, and the upper limit is preferably 0.90 or less, more preferably 0.80 or less, and still more preferably 0.70 or less. When the molar ratio of the lithium element to the phosphorus element, the molar ratio of the sulfur element to the phosphorus element, and the molar ratio of the halogen element to the phosphorus element are within the above ranges, the obtained solid electrolyte is likely to exhibit an RII type crystal structure, and a solid electrolyte having more stable and high ion conductivity is obtained. The molar ratio of these elements is substantially the same as the molar ratio of each element contained in the solid electrolyte obtained by the production method of the present embodiment.

(Use)

In the production method of the present embodiment, as described above, a solid electrolyte having predetermined properties can be obtained by using raw materials containing the yellow phosphorus and the compound, particularly by using the yellow phosphorus. In the present embodiment, the method for obtaining a solid electrolyte is not particularly limited as long as a solid electrolyte having predetermined properties is obtained. For example, the solid electrolyte can be obtained by the reaction of raw materials containing the yellow phosphorus and the compound.

In the production method of the present embodiment, the method of performing the reaction is not particularly limited, but the reaction is preferably performed by a treatment with mixing, stirring, pulverization, or a combination thereof. By performing these treatments, the reaction rate can be improved, and the solid electrolyte can be produced more efficiently.

The mixing method is not particularly limited, and for example, raw materials containing yellow phosphorus and a compound containing a lithium element, a sulfur element, and a halogen element, and the like may be put into a production apparatus capable of mixing the raw materials containing the yellow phosphorus and the compound containing the lithium element, the sulfur element, and the halogen element, and mixed. The production apparatus is not particularly limited as long as the raw materials containing the yellow phosphorus and the compound can be mixed, and for example, a media type mill can be used.

The media type mill is roughly classified into a container driving-type mill and a media stirring-type mill. Examples of the container driving-type mill include a stirring tank, a pulverization tank, and a ball mill, a bead mill, and the like which are a combination thereof. Examples of the media stirring-type mill include impact pulverizers such as a cutter mill, a hammer mill, and a pin mill; tower pulverizers such as a tower mill; stirring tank pulverizers such as an attritor, an aquamizer, and a sand grinder; flow tank pulverizers such as a visco mill and a pearl mill; flow tube pulverizers; annular pulverizers such as a coball mill; continuous dynamic pulverizers; and various pulverizers such as a single-screw or multi-screw kneader.

These pulverizers can be appropriately selected depending on the desired scale and the like, and a container driving-type mill such as a ball mill or a bead mill can be used in the case of a relatively small scale, and a pulverizer of another type is preferably used in the case of a large scale or mass production.

In the case of using such a pulverizer, raw materials containing yellow phosphorus and the above-mentioned compound or the like and a pulverization medium are put into the pulverizer, and the apparatus is started to perform mixing, stirring, and pulverization. Here, the raw materials containing yellow phosphorus and the above-mentioned compound and the like, and the pulverization media are put into the pulverizer, but the order of charging is not limited.

In the production method of the present embodiment, the raw materials containing yellow phosphorus and the compound are preferably mixed in a solid state, whereby the yellow phosphorus and the compound are more easily brought into contact with each other, and the reaction further proceeds. Therefore, a solid electrolyte having stable and high ion conductivity can be obtained more efficiently. From the viewpoint of promoting the contact between the yellow phosphorus and the compound to obtain a solid electrolyte having stable and high ion conductivity more efficiently, it is preferable to mix the raw materials containing the yellow phosphorus and the compound and further perform a treatment such as stirring, pulverization, or stirring and pulverization. In addition, from the viewpoint of promoting the contact between yellow phosphorus and the compound, it is particularly preferable to perform a treatment including pulverization, that is, a treatment of pulverization or a treatment of stirring and pulverization. By performing the treatment including pulverization, the surfaces of the yellow phosphorus and the compound, in particular, the surfaces of the compound are pulverized, new surfaces are exposed, and contact at the new surfaces is promoted. Therefore, the reaction between the yellow phosphorus and the compound further proceeds, and a solid electrolyte having stable and high ion conductivity is obtained more efficiently.

For example, when devices such as ball mills and bead mills are described as examples, these mills can be used for a treatment with mixing, stirring, pulverization, or a combination thereof by selecting the particle diameter of media such as balls and beads (usually about $\varphi 2$ to 20 mm for balls and about $\varphi 0.02$ to 2 mm for beads), materials (for example, metals such as stainless steel, chrome steel, and tungsten carbide; ceramics such as zirconia and silicon nitride; and minerals such as agate), the rotation speed of a rotor, and time, and can adjust the particle diameter or the like of the obtained solid electrolyte.

In the present embodiment, these conditions are not particularly limited. For example, stirring and pulverization can be performed using ball mills, particularly planetary ball mills, using ceramic balls, particularly zirconia balls, having a particle diameter of $\varphi 2$ to 15 mm at the rotation speed of a rotor of 300 to 1000 rpm for 0.5 to 100 hours.

The temperature at the time of mixing, stirring, and pulverization is not particularly limited, and may be, for example, 20 to 80° C.

In the present embodiment, after the raw materials containing yellow phosphorus and the compound and the like are mixed, yellow phosphorus and the compound may be further added and mixed, and this may be repeated two or more times.

In the case where the raw materials containing yellow phosphorus and the compound and the like are mixed and stirred, yellow phosphorus and the compound may be further added and mixed during and/or after the mixing and stirring, and the mixing and stirring may be repeated two or more times. For example, the raw materials containing yellow phosphorus and the compound and the like may be put into a container of a ball mill or a bead mill, mixing and stirring may be started, and yellow phosphorus and the compound may be further put into the container during mixing and stirring, or after the mixing and stirring (after the mixing and stirring is once stopped), yellow phosphorus and the compound may be put into the container, and the mixing and stirring may be resumed, or the yellow phosphorus and the compound, may be put into the container during and after the mixing and stirring.

In addition, in the case of mixing the raw materials containing yellow phosphorus and the compound and the like, and pulverizing the mixture, or in the case of stirring and pulverizing the mixture, yellow phosphorus and the compound may be further added in the same manner as in the case of stirring.

In this way, by further adding yellow phosphorus and the compound, the number of times of treatment such as removal of the solvent, which is performed as necessary, can be reduced, and thus the solid electrolyte can be obtained more efficiently.

When the treatment with mixing, stirring, pulverization, or a combination thereof is performed, a solvent may be used as necessary together with the raw materials containing yellow phosphorus and the compound. However, in order to reduce the burden of removing the solvent, the amount of the solvent to be used is preferably kept to a necessary minimum.

When a solvent is used, it is necessary to remove the solvent. For example, a method in which a solid electrolyte containing the solvent is transferred to a container, and after the solid electrolyte is precipitated, the solvent as a supernatant is removed, or a method in which the solvent is removed by drying or the like can be used. The removal of the solvent by drying can be performed by selecting a heater such as a hot plate or other equipment such as a dryer according to the amount to be dried, and heating at 50 to 90° C. to volatilize the solvent. When an aromatic hydrocarbon solvent such as xylene or ethylbenzene is used, reduced pressure drying may be performed at a temperature of about 90 to 110° C. using a vacuum pump or the like.

In the present embodiment, the reaction is preferably carried out in a solid state. By carrying out the reaction of yellow phosphorus and the compound, for example, a treatment with mixing, stirring, pulverization, or a combination thereof of the raw materials containing yellow phosphorus and the compound in a solid state, a solid electrolyte having more stable and high ion conductivity can be easily obtained.

In the present embodiment, yellow phosphorus is preferably handled in an inert gas atmosphere (for example, a nitrogen atmosphere or an argon atmosphere) in the reaction, for example, in the treatment with mixing, stirring, pulverization, or a combination thereof of the raw materials containing yellow phosphorus and the compound. For example, in the case where the reaction is carried out in a media type mill such as a ball mill or a bead mill, the reaction may be carried out in an inert gas atmosphere when yellow phosphorus, the compound, zirconia balls, and the like are put into a sealable container attached to the mill. The container is preferably filled with an inert gas before sealing. Therefore, in the present embodiment, the reaction is preferably carried out in an inert gas atmosphere.

Further, in the present embodiment, the reaction, for example, the treatment with mixing, stirring, pulverization, or a combination thereof of the raw materials containing yellow phosphorus and the compound can be carried out in the presence or absence of a solvent, and is preferably carried out in the absence of a solvent from the viewpoint of obtaining a solid electrolyte having more stable and high ion conductivity and from the viewpoint of omitting a step of removing a solvent.

When a solvent is used, examples of the solvent include various hydrocarbon solvents such as aliphatic hydrocarbon solvents such as hexane, pentane, 2-ethylhexane, heptane, octane, decane, undecane, dodecane, and tridecane; alicyclic hydrocarbon solvents such as cyclohexane and methylcyclohexane; and aromatic hydrocarbon solvents such as benzene, toluene, xylene, mesitylene, ethylbenzene, tert-butylbenzene, trifluoromethylbenzene, and nitrobenzene; and solvents containing a carbon element, such as solvents containing a carbon atom and a hetero atom, such as carbon disulfide, diethyl ether, dibutyl ether, and tetrahydrofuran. Here, the use of water as the solvent is not preferable because it lowers the performance of the solid electrolyte.

(Amorphous Solid Electrolyte)

In the production method of the present embodiment, the reaction includes reacting yellow phosphorus with the compound to obtain an amorphous solid electrolyte. When the reaction is carried out by the treatment with mixing, stirring, pulverization, or a combination thereof, the production method of the present embodiment includes treating raw materials containing yellow phosphorus and the compound with mixing, stirring, pulverization, or a combination thereof to obtain an amorphous solid electrolyte.

The amorphous solid electrolyte obtained by the above-mentioned reaction is a solid electrolyte containing at least a phosphorus element, and also containing a phosphorus element, a lithium element, a sulfur element, and a halogen element. In the description herein, the amorphous solid electrolyte is a solid electrolyte in which an X-ray diffraction pattern in X-ray diffractometry is a halo pattern in which a peak other than a peak derived from a material is substantially not observed, and means that the presence or absence of a peak derived from a raw material of the solid electrolyte is not limited.

The amorphous solid electrolyte obtained by the method for producing a solid electrolyte of the present embodiment is not particularly limited as long as it contains a lithium element, a phosphorus element, a sulfur element, and a halogen element and becomes an RII solid electrolyte having a crystal structure having peaks at $2\theta=20.2°\pm0.5°$ and $23.6°\pm0.5°$ in X-ray diffractometry using a CuKα ray when a crystalline solid electrolyte is obtained by a method described later. That is, the solid electrolyte obtained by the method for producing a solid electrolyte of the present embodiment may be amorphous or crystalline, which will be described later, and can be selected as desired.

Typical examples of the amorphous solid electrolytes include those containing at least a lithium element, a phosphorus element, a sulfur element, and a halogen element, such as $Li_2S$—$P_2S_5$—$LiI$, $Li_2S$—$P_2S_5$—$LiCl$, $Li_2S$—$P_2S_5$—$LiBr$, $Li_2S$—$P_2S_5$—$LiI$—$LiBr$, $Li_2S$—$P_2S_5$—$Li_2O$—$LiI$, and $Li_2S$—$SiS_2$—$P_2S_5$—$LiI$. The type of the element constituting the amorphous solid electrolyte can be confirmed by, for example, an ICP emission spectrophotometer.

The shape of the amorphous solid electrolyte is not particularly limited, and examples thereof include a particle shape. The average particle diameter ($D_{50}$) of the particulate amorphous solid electrolytes is, for example, in the range of 0.01 μm to 500 μm or 0.1 μm to 200 μm.

(Heat Treatment)

In the method for producing a solid electrolyte of the present embodiment, the reaction may include heat-treating the amorphous solid electrolyte to obtain a crystalline solid electrolyte.

The heating temperature in the heat treatment can be appropriately selected depending on the structure of the amorphous solid electrolyte. For example, the amorphous solid electrolyte is subjected to differential thermal analysis (DTA) using a differential thermal analyzer (DTA apparatus) under a temperature rising condition of 10° C./min, and the heating temperature is preferably within ±40° C., more preferably within ±30° C., and still more preferably within ±20° C. from the peak top of the exothermic peak observed on the lowest temperature side. More specifically, the heating temperature is preferably 150° C. or higher, more preferably 170° C. or higher, and still more preferably 190° C. or higher. On the other hand, the upper limit of the heating temperature is not particularly limited, but is preferably 300° C. or lower, more preferably 280° C. or lower, and still more preferably 250° C. or lower.

The heating time by the heat treatment is not particularly limited as long as a desired crystalline solid electrolyte can be obtained. For example, the heating time is preferably 1 minute or more, more preferably 10 minutes or more, and still more preferably 30 minutes or more. The upper limit of the heating time is not particularly limited, but is preferably 24 hours or less, more preferably 10 hours or less, and still more preferably 5 hours or less.

The heating by the heat treatment is preferably performed in an inert gas atmosphere (e.g., a nitrogen atmosphere or an argon atmosphere) or a reduced-pressure atmosphere (particularly, in a vacuum). This is because deterioration (for example, oxidation) of the crystalline solid electrolyte can be prevented. The heating method is not particularly limited, and examples thereof include a method using a hot plate, a vacuum heating apparatus, an argon gas atmosphere furnace, and a firing furnace. Industrially, a horizontal dryer having a heating means and a feeding mechanism, a horizontal vibration fluidized dryer, or the like can also be used.

(Crystalline Solid Electrolyte)

As described above, a crystalline solid electrolyte is obtained by heat-treating an amorphous solid electrolyte. In the description herein, the crystalline solid electrolyte is a solid electrolyte in which a peak derived from the solid electrolyte is observed in an X-ray diffraction pattern in X-ray diffractometry, and is a material regardless of the presence or absence of a peak derived from a raw material of the solid electrolyte. That is, the crystalline solid electrolyte includes a crystal structure derived from the solid electrolyte, and a part of the crystalline solid electrolyte may be a crystal structure derived from the solid electrolyte or the whole thereof may be a crystal structure derived from the solid electrolyte. In addition, as long as the crystalline solid electrolyte has the above-mentioned X-ray diffraction pattern, an amorphous solid electrolyte may be contained in a part of the crystalline solid electrolyte.

The crystalline solid electrolyte obtained by the method for producing a solid electrolyte of the present embodiment is an RII solid electrolyte containing a lithium element, a phosphorus element, a sulfur element, and a halogen element, and having an RII crystal structure having peaks at $2\theta=20.2°\pm0.5°$ and $23.6°\pm0.5°$ in X-ray diffractometry using a CuKα ray. Here, the peak at $2\theta=20.2°$ refers to not only an exact peak at $2\theta=20.2°$ but also a peak within a range of $2\theta=20.2°\pm0.5°$. Since there is a possibility that the position of the peak is slightly fluctuated depending on the state of the crystal, it is defined as described above. Similarly, the peak at 2θ=23.6° means not only an exact peak at 2θ=23.6° but also a peak within a range of 2θ=23.6°±0.5°. The RII type crystal structure usually has peaks at 2θ=29.4°, 37.8°, 41.1°, and 47.0° in addition to 2θ=20.2° and 23.6°. These peak positions may also be fluctuated within a range of ±0.5°.

The shape of the crystalline solid electrolyte is not particularly limited, and examples thereof include a particle shape. The average particle diameter ($D_{50}$) of the particulate crystalline sulfide-based solid electrolytes is, for example, in the range of 0.01 μm to 500 μm or 0.1 μm to 200 μm.

The solid electrolyte obtained by the production method of the present embodiment has excellent battery performance with stable and high ion conductivity, and is suitably used for batteries. The use of a lithium element as the conductive species is particularly preferred. The sulfide-based solid electrolyte obtained by the production method of the present embodiment may be used for a positive electrode layer, or may be used for a negative electrode layer, or may be used for an electrolyte layer. Each layer can be produced by a known method.

Further, the battery preferably uses a current collector in addition to the positive electrode layer, the electrolyte layer, and the negative electrode layer, and as the current collector, a known current collector can be used. For example, a layer in which a layer that reacts with the above-mentioned sulfide-based solid electrolyte, such as Au, Pt, Al, Ti, or Cu, is coated with Au or the like can be used.

EXAMPLES

Next, the present invention will be described specifically with reference to examples, but the present invention is not limited to these examples.

Production Example 1: Production of Yellow Phosphorus 1 g of red phosphorus (purity: 99.999%, manufactured by Kojundo Chemical Laboratory Co., Ltd.) was put into a quartz tube sealed on one side, and the inside was evacuated by a rotary pump to seal the other side. The quartz tube on the side containing red phosphorus was heated to 430° C. in a ring furnace to sublimate the red phosphorus and condense it as yellow phosphorus on the side kept at room temperature. After sufficient cooling, waxy yellow phosphorus was recovered in a glove box under an argon atmosphere.

Production Example 2: Production of Lithium Sulfide

In a 500 mL separable flask equipped with an anchor stirring blade, 200 g of anhydrous lithium hydroxide (manufactured by The Honjo Chemical Corporation, particle size range: 0.1 mm or more and 1.5 mm or less, water content: 1% by mass or less) dried under an inert gas was charged. While the mixture was stirred with 100 rpm, the temperature was raised under a nitrogen flow, and the internal temperature (powder) was maintained at 200° C. using an oil bath. At the same time, the upper part of the separable flask was maintained at 130° C. by a ribbon heater. The nitrogen gas was switched to hydrogen sulfide (manufactured by Sumitomo Seika Co., Ltd.), the flow rate was set to 500N-mL/min, and the reaction of anhydrous lithium hydroxide with hydrogen sulfide was carried out at a reaction temperature of 200° C. while stirring the mixture with an anchor blade (rotation speed: 100 rpm). The particle size range and the water content of anhydrous lithium hydroxide were measured by the above-mentioned methods, respectively.

The water generated by the reaction was condensed and recovered by a condenser. When the reaction was carried out for 6 hours, 144 ml of water was recovered. Further, the reaction was continued for 3 hours while the hydrogen sulfide was maintained at a flow rate of 500N-mL/min, but generation of water was not observed. In addition, adhesion of the reaction product or the like to the separable flask or the like was not observed.

Subsequently, in a state where the temperature was maintained at 200° C., hydrogen sulfide was switched to nitrogen gas, and nitrogen gas was passed through the flask for 20 minutes to replace hydrogen sulfide in the flask with nitrogen gas. The internal temperature was lowered while nitrogen gas was circulated, and the product was recovered.

The purity of lithium sulfide, the amount of lithium hydroxide in lithium sulfide, and the water content of lithium sulfide of the recovered product were measured, and the results were 98.5% by mass, 0.1% by mass or less, and 0.01% by mass or less, respectively. It should be noted that the "detection limit" of the amount of lithium hydroxide is 0.1% by mass.

Example 1

In a glove box under an argon atmosphere, 0.148 g of the yellow phosphorus obtained in Production Example 1, 0.329 g of the lithium sulfide obtained in Production Example 2, 0.383 g of elemental sulfur (purity: 99%, manufactured by FUJIFILM Wako Pure Chemical Corporation), and 0.140 g of lithium bromide were weighed and put into a container (45 cc, made by zirconia) for a planetary ball mill, 10 zirconia balls (10 mmφ) were further placed therein, and the container was completely sealed. The container was taken out of the glovebox and attached to a planetary ball milling machine (trade name: Classic Line P-7, manufactured by Fritsch Japan Co., Ltd.), and mixed, stirred, and pulverized at the same time for 40 hours at a platen rotation speed of 370 rpm to prepare a powdery solid electrolyte.

The obtained powdery solid electrolyte was subjected to differential thermal analysis (DTA) using a differential thermal analyzer (DTA apparatus) under a temperature rising condition of 10° C./min, and it was confirmed that the solid electrolyte had a crystallization peak in the vicinity of 214° C. and a phase transition peak in the vicinity of 260° C. In addition, powder X-ray analysis (XRD) measurement was performed using an X-ray diffraction (XRD) apparatus (desktop X-ray diffraction apparatus, "D2 PHASER (model number)", manufactured by BRUKER). The X-ray analysis spectrum is shown in FIG. 1. As shown in FIG. 1, since there was no peak other than the peak derived from the raw material, it was found that the solid electrolyte was amorphous.

Figure 2:
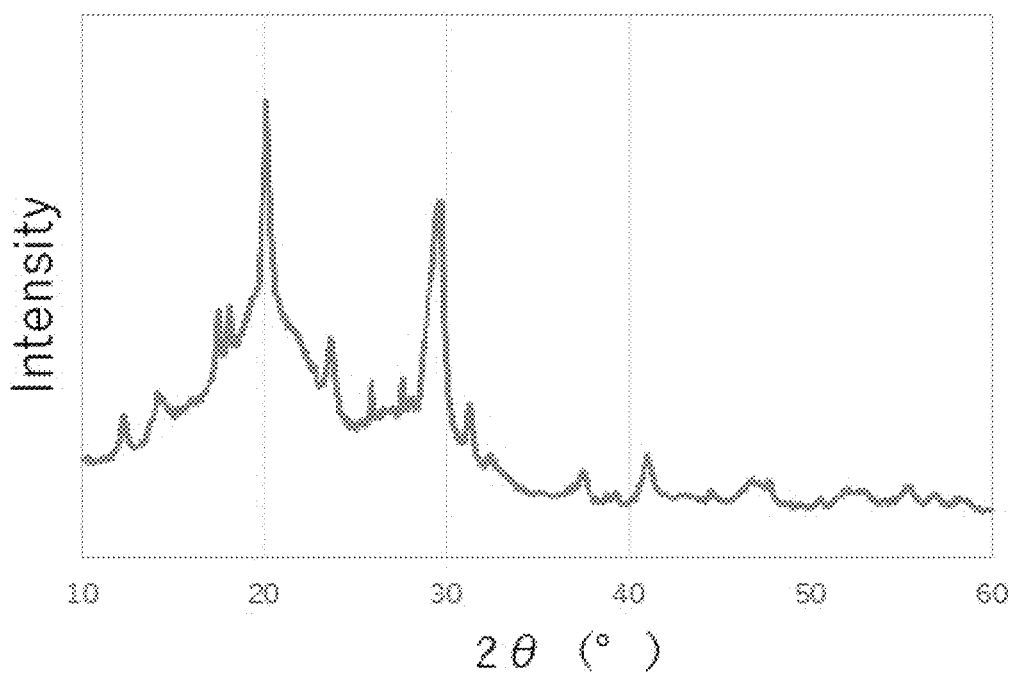
FIG. 2 is an X-ray analysis spectrum of the crystalline solid electrolyte obtained in Example 1.

Next, the amorphous solid electrolyte was subjected to a heat treatment at 200° C. for 3 hours in a nitrogen atmosphere (dew point: −70° C. or lower). With regard to the solid electrolyte after the heat treatment, powdery X-ray analysis (XRD) measurement was performed using an X-ray diffraction (XRD) apparatus (desktop X-ray diffraction apparatus, "D2 PHASER (model number)", manufactured by BRUKER). The X-ray analysis spectrum is shown in FIG. 2. As shown in FIG. 2, crystallization peaks were detected at 2θ=20.1° and 23.7°, and it was confirmed that a crystalline solid electrolyte (RII solid electrolyte) was obtained. In addition, regarding the amount of yellow phosphorus, lithium sulfide, elemental sulfur, and lithium bromide used, the molar ratio of lithium element to phosphorus element (lithium element/phosphorus element) was 3.33, the molar ratio of sulfur element to phosphorus element (sulfur element/phosphorus element) was 4.00, and the molar ratio of bromine element to phosphorus element (bromine element/phosphorus element) was 0.34. The molar ratio of each of the above-mentioned elements depending on the amounts of the raw materials used is substantially the same as the molar ratio of each of the elements measured using the obtained solid electrolyte.

(Measurement of Ion Conductivity)

Circular pellets having diameters 10 mm (cross-sectional areas S: 0.785 cm$^2$) and heights (L) of 0.1 to 0.3 cm were molded from the obtained crystalline solid electrolytes to prepare samples. Electrode terminals were taken from above and below the sample, and measurement was performed at 25° C. by an AC impedance method (frequency range: 5 MHz to 0.5 Hz, amplitude: 10 mV) to obtain Cole-Cole plot. The real part Z' (Ω) at the point where –Z" (Ω) is minimum in the vicinity of the right end of the arc observed in the high frequency region was defined as the bulk resistance R (Ω) of the electrolyte, and the ion conductivity σ (S/cm) was calculated according to the following equation.

$$R=\rho(L/S)$$

$$\sigma=1/\rho$$

As a result of the measurement, the ion conductivity of the crystalline solid electrolyte was $2.7\times10^{-3}$ (S/cm), and it was confirmed that the crystalline solid electrolyte had a high ion conductivity.

Comparative Example 1

Figure 3:
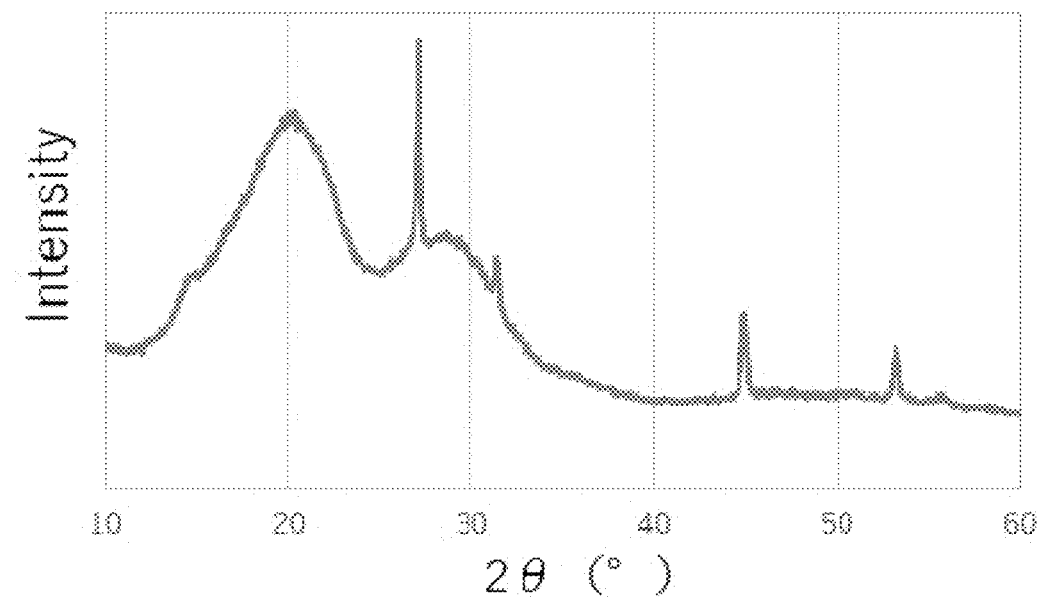
FIG. 3 is an X-ray analysis spectrum of the amorphous solid electrolyte obtained in Comparative Example 1.

A powdery solid electrolyte was obtained in the same manner as in Example 1 except that red phosphorus (purity: 99.999%, manufactured by Kojundo Chemical Laboratory Co., Ltd.) was used instead of yellow phosphorus in Example 1. The obtained powdery solid electrolyte was subjected to differential thermal analysis (DTA), and it was confirmed that the crystallization peak and the phase transition peak were not clearly separated. In addition, powdery X-ray analysis (XRD) measurement revealed that the solid electrolyte was an amorphous solid electrolyte because there was no peak other than the peak derived from the raw material (see FIG. 3). As shown in FIG. 3, in the obtained solid electrolyte, a peak of lithium sulfide is strongly observed, and it is found that the reaction is insufficient when red phosphorus is used.

Figure 4:
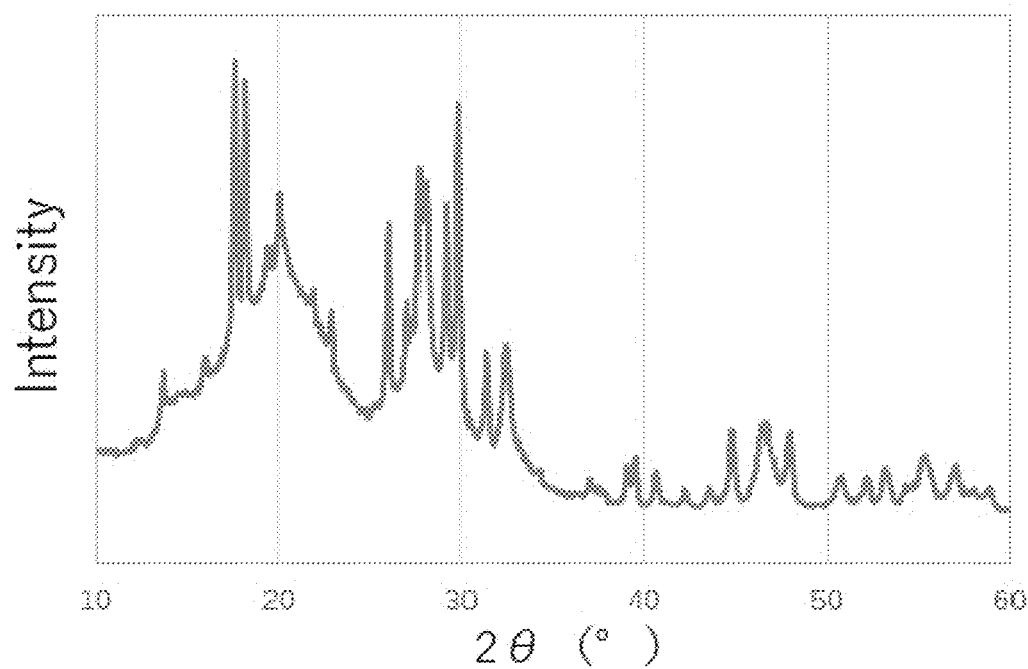
FIG. 4 is an X-ray analysis spectrum of the crystalline solid electrolyte obtained in Comparative Example 1.

The obtained amorphous solid electrolyte was heat-treated in the same manner as in Example 1. The solid electrolyte after the heat treatment was subjected to powdery X-ray diffraction (XRD) measurement, and the obtained X-ray diffraction spectrum is shown in FIG. 4. As shown in FIG. 4, crystallization peaks were not clearly detected at 2θ=20.2°±0.5° and 23.6°±0.5°, and a crystalline solid electrolyte (RII solid electrolyte) was not obtained. On the other hand, crystallized peaks attributable to the $P_2S_6$ type crystal structure were detected at 2θ=16.9°±0.5°, 27.1°±0.5°, 32.5°±0.5°, and the like. In addition, the ion conductivity was as low as $0.26\times10^{-3}$ (S/cm). Therefore, it is considered that this is because the RII type crystal structure was not obtained and the $P_2S_6$ type crystal structure was formed.

When FIG. 2 is compared with FIG. 4, there is a possibility that the solid electrolyte obtained in Example 1 may also have the $P_2S_6$ type crystal structure, because crystallization peaks, which are considered to be attributable to the $P_2S_6$ type crystal structure, are slightly observed at 2θ=16.9°±0.5°, 27.1°±0.5°, 32.5°±0.5°, and the like in FIG. 2. However, since most of the peaks indicate the formation of the RII type crystal structure, it is considered that yellow phosphorus has a higher rate of formation of the RII type crystal structure and a relatively smaller amount of formation of the $P_2S_6^{4-}$ structure as compared with red phosphorus used in the Comparative Example, and as a result, the solid electrolyte of Example 1 has a high ion conductivity.

As described above, it was confirmed that an RII solid electrolyte was obtained when yellow phosphorus was used as elemental phosphorus, whereas an RII solid electrolyte was not obtained when elemental phosphorus other than yellow phosphorus (red phosphorus) was used, and a solid electrolyte having a high ion conductivity was not obtained.

INDUSTRIAL APPLICABILITY

According to the method for producing a solid electrolyte of the present embodiment, a solid electrolyte having stable and high ion conductivity can be produced. The solid electrolyte is suitably used for a battery, in particular, a battery used for an information-related device, a communication device, or the like such as a personal computer, a video camera, and a mobile phone.

The invention claimed is:

1. A method for producing a solid electrolyte, the method comprising:
    mixing, stirring, pulverizing, and/or milling raw materials comprising yellow phosphorus, elemental sulfur, and a compound comprising a lithium element and a halogen element, to obtain an amorphous solid electrolyte; and
    subjecting the amorphous solid electrolyte to a heat treatment to obtain a crystalline solid electrolyte,
    wherein the raw materials comprise 0 to 50 parts by mass of phosphorus sulfide, relative to 100 parts of the yellow phosphorus,
    wherein the crystalline solid electrolyte has peaks at 2θ=20.2°±0.5° and 23.6°±0.5° in X-ray diffractometry using a CuKα ray,
    wherein the crystalline solid electrolyte comprises the lithium element, a phosphorus element, the sulfur element, and the halogen element.

2. The method of claim 1, wherein the raw materials are subjected to the mixing, stirring, and pulverization.

3. The method of claim 2, wherein the mixing, stirring, and pulverizing is performed in a solid state.

4. The method of claim 1, comprising the mixing.

5. The method of claim 1, wherein, in the raw materials, a Li—S—X compound is at least one compound selected from lithium sulfide, elemental sulfur, phosphorus halide, phosphorus thiohalide, lithium halide, and elemental halogen.

6. The method of claim 1, wherein, in the raw materials, a molar ratio of the phosphorus element, the lithium element, the sulfur element, and the halogen element is 0.8 or more and 1.2 or less: 2.5 or more and 4.5 or less: 3.0 or more and 5.0 or less: 0.1 or more and 1.0 or less.

7. The method of claim 1, wherein, in the raw materials, a molar ratio of the lithium element to the phosphorus element is more than 3.0 and 3.5 or less.

8. The method of claim 1, wherein, in the raw materials, a molar ratio of the sulfur element to the phosphorus element is 3.5 or more and 4.5 or less.

9. The method of claim 1, wherein, in the raw materials, a molar ratio of the halogen element to the phosphorus element is 0.10 or more and 0.90 or less.

10. The method of claim 1, wherein no solvent is used.

11. The method of claim 1, comprising the stirring.

12. The method of claim 1, comprising the pulverizing and/or the milling.

13. The method of claim 1, wherein a temperature of the mixing, stirring, pulverizing, and/or milling is in a range of from 20 to 80° C., during the mixing, stirring, pulverizing, and/or milling.

14. The method of claim 1, wherein, in the raw materials, a Li—S—X compound comprises lithium sulfide, elemental sulfur, phosphorus halide, phosphorus thiohalide, lithium halide, elemental halogen, or a mixture thereof.

15. The method of claim 1, further comprising:
subliming red phosphorus to obtain the yellow phosphorus, prior to the mixing, stirring, pulverizing, and/or or milling.

16. The method of claim 1, wherein the raw materials do not comprise a phosphorus sulfide.

17. The method of claim 1, wherein the raw materials comprise no tetraphosphorus heptasulfide ($P_4S_7$) and no tetraphosphorus nonasulfide ($P_4S_9$).

18. The method of claim 1, wherein the raw materials comprise 30 parts by mass or less of phosphorus sulfide, relative to 100 parts of the yellow phosphorus.

19. The method of claim 1, wherein the raw materials comprise 15 parts by mass or less of phosphorus sulfide, relative to 100 parts of the yellow phosphorus.

20. The method of claim 1, wherein, with respect to 100 parts by mass of the yellow phosphorus, the raw materials comprise 30 parts by mass or less of other allotropes of phosphorus.

* * * * *